June 3, 1924.
P. B. STREICH
1,496,075
DISCHARGE MECHANISM FOR DOUGH SCALING MACHINES
Filed Dec. 4, 1920     3 Sheets-Sheet 1
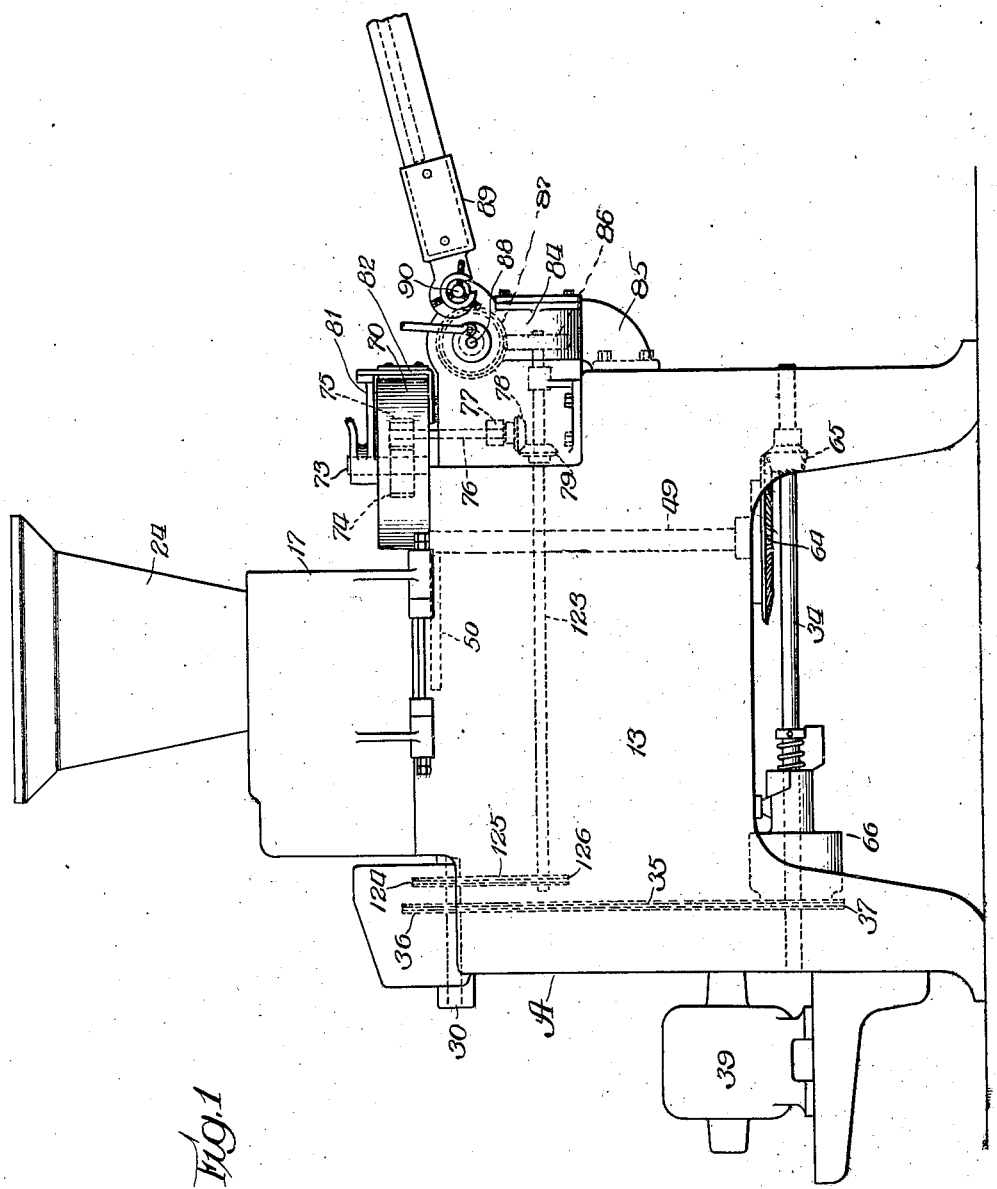
Inventor
Paul B. Streich,
By Charles O. Shurey
Atty.

June 3, 1924.
P. B. STREICH
1,496,075
DISCHARGE MECHANISM FOR DOUGH SCALING MACHINES
Filed Dec. 4, 1920   3 Sheets-Sheet 2
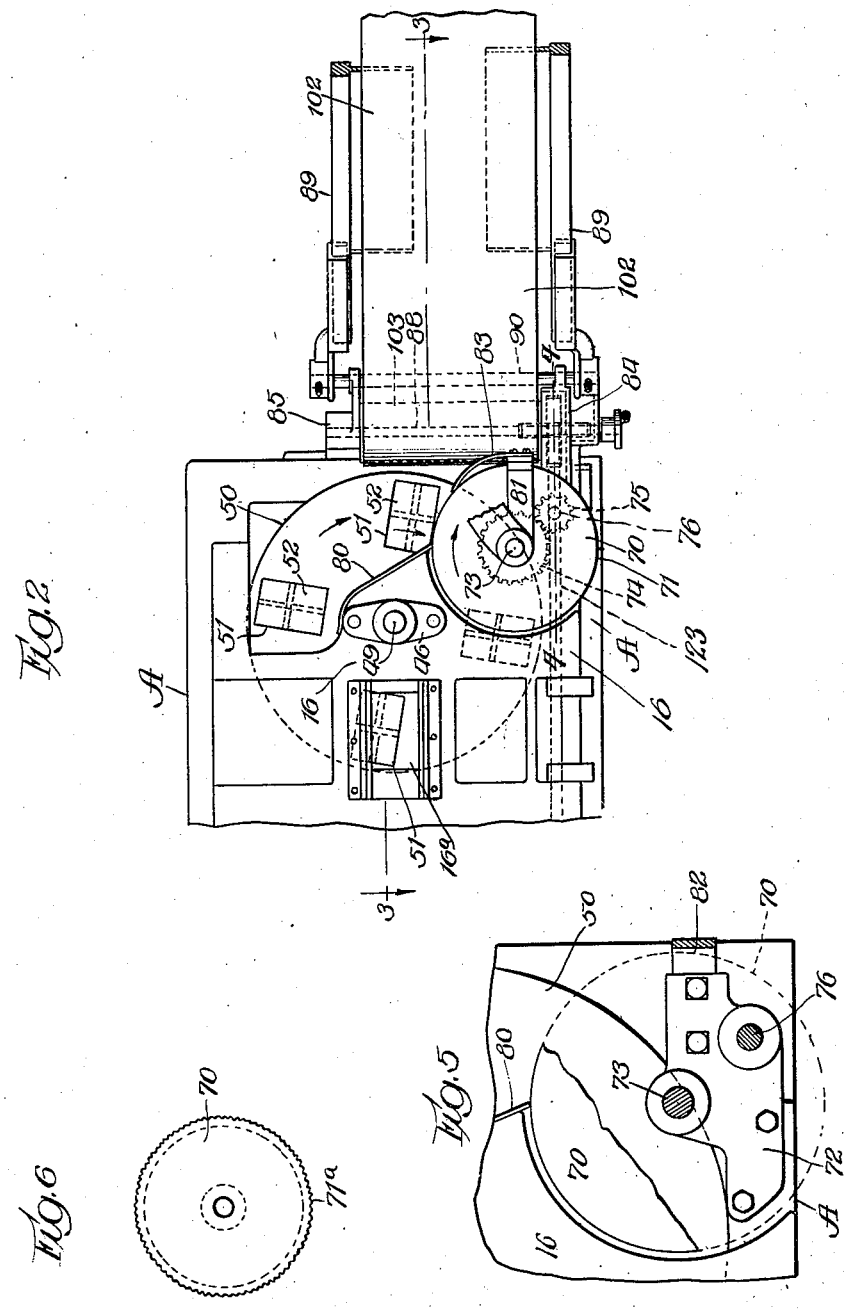

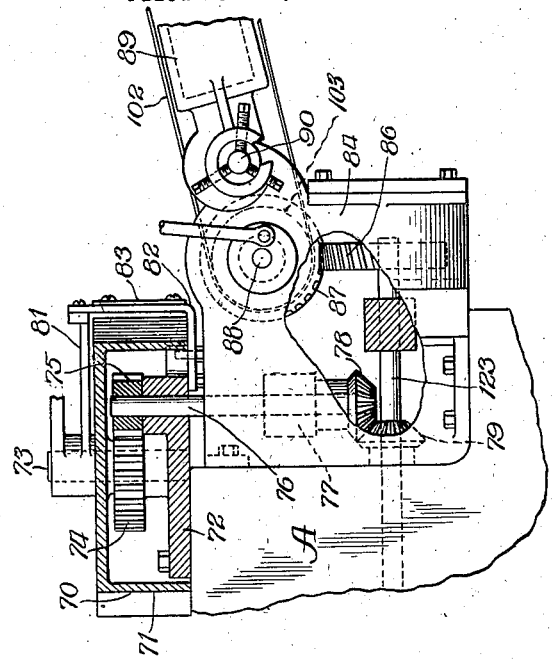

Patented June 3, 1924.

1,496,075

UNITED STATES PATENT OFFICE.

PAUL B. STREICH, OF JOLIET, ILLINOIS, ASSIGNOR TO THE UNION WRAPPING MACHINE COMPANY, OF JOLIET, ILLINOIS, A CORPORATION OF ILLINOIS.

DISCHARGE MECHANISM FOR DOUGH-SCALING MACHINES.

Application filed December 4, 1920. Serial No. 428,186.

*To all whom it may concern:*

Be it known that I, PAUL B. STREICH, a citizen of the United States, and a resident of Joliet, Will County, and State of Illinois, have invented certain new and useful Improvements in Discharge Mechanism for Dough-Scaling Machines, of which the following is declared to be a full, clear, and exact description.

This invention relates to dough scaling machines and more particularly to the mechanism for discharging the lumps of dough therefrom after the scaling operation has been completed. Dough and other plastic materials are difficult to handle, particularly when moving them from one surface to another, because of the danger of the dough or other plastic material adhering to the surfaces with which it comes in contact. One of the objects of the present invention is to provide traveling means for engaging and deflecting or discharging moving lumps of dough or other plastic material from a carrier whereby it may be conveyed away from the carrier for a subsequent operation. Another object is to provide a discharge device for lumps of dough or other plastic material which is noiseless in operation, is smooth in action and is free from jarring actions which are objectionable and cause unnecessary wear and tear on the mechanism.

The invention consists in discharge mechanism for discharging plastic material from a moving carrier and having an element contacting with the surface of said carrier, and movable across the path of travel of the lumps of dough to be discharged, whereby they are deflected from such path of travel, and discharged from the surface which carries them to the discharge mechanism. It further consists in the several novel features hereinafter fully set forth and claimed.

The invention is clearly illustrated in the accompanying drawing, in which:

Fig. 1 is a side elevation of a dough scaling machine, illustrating a simple embodiment of the present invention applied thereto; Fig. 2 is a fragmental plan of the machine with a certain top member removed and showing, in plan, the discharge mechanism; Fig. 3 is a vertical, fragmental section taken on the line 3—3 of Fig. 2; Fig. 4 is a detail, vertical section taken on the line 4—4 of Fig. 2, certain parts being illustrated in side elevation; Fig. 5 is a detail plan of fragments of the frame, carrier, discharge member and a certain bearing bracket, and Fig. 6 is a plan illustrating a slight modification of the discharge member.

Referring to said drawings, which illustrate a simple embodiment of the invention, the reference character A designates the main frame of a dough scaling machine which contains mechanism for automatically scaling or dividing dough or other plastic material into lumps of predetermined weight; such mechanism including a rotatory table by which the lumps of weighed material are conveyed toward the discharge mechanism. A complete scaling machine of this character is illustrated and described in Letters Patent No. 1,278,517, issued September 10, 1918, upon an application of Frank Streich, to which reference is herein made for a full and complete understanding of a dough scaling machine, and the present invention is illustrated in connection with the scaling machine disclosed in said patent, although it is to be understood that its use is not limited thereto.

Briefly, the main frame comprises side frame member 13 and end frame members 14. At the top of said frame members is a top plate 16, to which is hingedly secured a feed roll carrying frame 17, in which are the feed rolls, one of which is shown at 26 (see Fig. 3) that feed the dough to the scaling mechanism. A hopper 24 secured to the top of the frame 17 receives the mass of dough which is to be divided. In the top plate 16 below the feed rolls is a discharge opening 16ª through which the dough is fed to the scaling mechanism. Below the top plate 16 is a rotatory table 50 which is mounted on and driven by a shaft 49, journalled in bearings 46, 47, which are carried by the frame A. Said shaft 49 is driven from a motor 39 by drive mechanism including a main drive shaft 34 journalled on bearings carried by the frame A, and a beveled pinion 65 fast on the shaft 34 which meshes with a beveled gear wheel 64 fast on the shaft 49. In the table 50 are pockets 51 in which are vertically reciprocating scale plates 52 that are supported by rollers 54 on a circular track 56 that has inclined and declined portions on which the rollers run. The inclined portions raise the scale plates, and the declined portions permit the scale plates to fall in the pockets. Trip mechanism including a trip block 60 is interposed in the circular track and is acted on by the rollers to operate a clutch 66 in the main shaft 34 and thereby operatively connect the shaft 34 with the motor to thereby rotate the table 50, there being automatic stop mechanism for throwing out the clutch to stop rotation of the table 50 when it has moved through a predetermined distance. Four pockets and scale plates are shown in the table and consequently the stop mechanism is arranged to permit rotation of the table through an arc of ninety degrees each time the clutch is thrown in, thereby bringing a succeeding pocket into register with the discharge opening 16$^a$ under the feed rolls and simultaneously bringing a pocket, its scale plate and the dough, carried thereby, to the discharge mechanism.

The arrangement of the circular track is such that the scale plates are raised by the highest part of the track to bring the upper faces of the scale plates flush with the upper face of the table before they reach the discharge mechanism and the scale plates are held in such raised position during their passage across but below the operative face of the discharge member as will be more fully set forth. Fig. 3 shows one of the pockets and scale plates in register with the discharge opening 16$^a$, below the feed rolls, its scale plate occupying its lower position at this place, and another pocket and scale plate immediately in front of but below the discharge member, with the scale plate raised flush with the top of the table.

The dough scaling parts described are more fully set forth in the prior patent above mentioned, and require no further description so far as this specification is concerned: the discharge mechanism, which forms the subject matter of this invention will now be described.

At the discharge side of the machine, and contiguous with the top of the rotatory table 50 is a dough discharge member 70 which is shown in the form of a rotatory drum, having a cylindrical face 71 which contacts with and rises from the table 50 in the path of travel of lumps of dough that are ejected from the pockets 51 and lie on the raised scale plates. Said drum is rotated in the direction of the arrow thereon in Fig. 2 by suitable drive mechanism connected to the drive mechanism of the scaling machine, and acts to discharge the lumps of dough from the table as they are brought into frictional contact with the drum by the rotating table. The drum 70 is made hollow as shown, and is rotatively mounted on a bearing bracket 72 which is bolted or otherwise secured to the frame A. A shaft 73, in the drum 70 and bearing bracket 72 forms the journal connection between the drum and bracket. A gear wheel 74 fixed to rotate with the drum meshes with a pinion 75 fast on the upper end of an upright shaft 76 which is journaled in the bearing bracket 70 72 and in a bearing bracket 77 and said shaft 76 has a beveled pinion 78 on its lower end which meshes with a beveled pinion 79 fast on a counter shaft 123 which is journaled in bearing brackets on the main frame A. As in the machine of the prior patent above referred to, the shaft 123 is driven from the main drive shaft by a sprocket chain 125 trained around a sprocket wheel 126 on the shaft 123, and a sprocket wheel 124 on a shaft 30, and a sprocket chain 35 trained around a sprocket wheel 36 fast on the shaft 30 and a sprocket wheel 37 fast on the continuously rotating member of the clutch 66. The gearing described forms a simple one for transmitting the rotary motion of the main shaft 34 to the dough discharge member 70.

Secured to the top plate 16 in front of the drum 70 is a guard plate 80 and secured to brackets 81, 82 is a knife or scraper 83, which contacts with the cylindrical face of the drum and scrapes off any particles which might adhere thereto. The bracket 81 runs to the shaft 73 of the drum and has a hub which surrounds the shaft and holds the drum in contact with the face of the carrier, and the bracket 82 is secured to the bearing bracket 72 (see Fig. 4). Space is left between the adjacent edges of the guard plate 80 and scraper 83 for the lumps of dough to contact with the cylindrical face of the discharge drum.

Below the edge of the table at the discharge side of the machine is a roller or pulley 103, which is rotatively mounted on brackets 84, 85, carried by the frame A, and said roller or pulley is driven from the shaft 123, by spiral gear wheels 86, 87, mounted respectively on the shaft 123 and a shaft 88 of the roller or pulley 103. A conveyer frame 89 is adjustably secured on a rod 90 carried by the brackets 84, 85 and an endless conveyer 102 is trained around the roller or pulley 103 and leads to a roller or pulley at the other end of the frame 89. The endless conveyer 102 conveys the lumps of dough to another machine for a subsequent operation.

The cylindrical discharge drum surface 71 may be made smooth, but I have illustrated in Fig. 6 a roughened or corrugated or knurled cylindrical face 71$^a$, which may be found preferable with certain kinds of dough or other plastic material.

In the operation of the discharge mechanism, as applied to the scaling machine illustrated, dough is fed into the pockets 51 by the feed mechanism, the table is intermittently rotated, and the scale plates raised flush with the top of the table before the lumps of dough reach the discharge drum. Fig. 2 shows the pockets 51 and scale plates 52 in a position where one is about to pass the discharge drum 70 and the lump of dough on said scale plate about to contact with the discharge drum which is continuously rotating in the direction of the arrow thereon in Fig. 2, and preferably at a higher rate of speed than the table. As the table continues to rotate, the lump of dough is pushed against the rotating cylindrical face of the drum 70 which forces it off the scale plate and table in a direction approximately radial of the table 50 and tangential with respect to the cylindrical drum face 71, the lump of dough being thereby discharged upon the endless conveyer 102 and carried away for a subsequent operation. Any dough adhering to the drum face 71 is scraped off by the knife or scraper 83.

From the above it is to be observed that all jars and shocks are eliminated by reason of the continuously rotating discharge element, and that noise and wear and tear on the parts is reduced to a minimum. While the mechanism has been shown and described as applied to a dough scaling machine, it is perfectly obvious that it may be employed in other situations where the discharge of plastic materials from a moving carrier is required.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. Discharge mechanism for dough scaling machines, comprising a dough carrier having a horizontal, flat traveling dough carrying surface from which the dough is to be discharged, and a dough discharge member having a vertical traveling surface extending transversely across the path of travel of the dough carried by the carrier, said dough discharge member being held in positive contact with the surface of said carrier whereby dough is scraped therefrom.

2. Discharge mechanism for dough scaling machines, comprising a horizontal, flat, rotatory table upon which the dough is carried and a vertical, rotatory dough discharge member having a traveling surface extending transversely across the path of travel of the dough carried by said table, said discharge member being held in positive contact with the surface of said table, whereby dough is scraped therefrom.

3. Discharge mechanism for dough scaling machines, comprising a horizontal, flat, rotatory table upon which the dough is carried, and a vertical, rotatory dough discharge drum whose cylindrical face is located in the path of travel of the dough carried by the table, said drum being held in positive contact with the surface of the table, whereby dough is scraped therefrom.

4. Discharge mechanism, comprising a horizontal rotatory table having pockets therein for receiving dough, and reciprocatory scale plates in said pockets, movable to a position flush with the face of the table, and a vertical discharge member held contiguous with and rising from said table and extending transversely across the path of travel of said pockets and scale plates and arranged to intercept dough carried by said scale plates.

5. Discharge mechanism, comprising a horizontal, rotatory table having pockets therein for receiving plastic material, and reciprocatory scale plates in said pockets, movable to a raised position flush with the face of the table, and a continuously rotating vertical drum contiguous with and rising from said table and held transversely across the path of travel of dough carried by said scale plates when in said raised position.

6. Discharge mechanism, comprising a rotatory table having a flat face formed with pockets extending down therefrom for receiving plastc material, and reciprocatory scale plates in said pockets movable to a raised position flush with the face of the table, a continuously rotating cylindrical drum extending across the path of travel of plastic material carried by said scale plates when in said raised position, one end of said drum contacting with said flat face of the table, and a scraper contacting with the face of said cylindrical drum.

7. Discharge mechanism comprising a rotatory table having a flat face formed with pockets extending down therefrom, for receiving plastic material, and reciprocatory scale plates in said pockets movable to a raised position flush with the face of the table, and a continuously rotating cylindrical drum having a roughened cylindrical surface extending across the path of travel of plastic material carried by said scale plates when in said raised position, one end of said drum contacting with the flat face of said table.

8. The combination of a frame, a horizontal, rotatory table mounted therein and having dough receiving pockets, and reciprocatory scale plates therein, drive mechanism for rotating said table, a vertical discharge member supported in said frame and held contiguous with said table and having a traveling surface extending transversely across the path of travel of lumps of dough carried by said scale plates, and drive mechanism for said drum operated by the drive mechanism for said table.

9. The combination of a frame, a horizontal rotatory table mounted therein and having dough receiving pockets, and reciprocatory scale plates therein, drive mechanism for rotating said table, a vertical, continuously rotating discharge drum supported on said frame and held contiguous with said table and having a traveling surface extending transversely across the path of travel of lumps of dough carried by said scale plates, and drive mechanism for said drum operated by the drive mechanism for said table.

10. The combination of a frame, an intermittently moving, rotatory, horizontal dough scaling table mounted therein, a vertical hollow dough discharging drum overlying and held in contact with said table, drum rotating gearing confined within the hollow of the drum, and drive mechanism for operating said gearing.

11. Mechanism for discharging dough, comprising in combination with a carrier, having a flat, dough carrying surface, a rotatory body held contiguous with the surface of the carrier and arranged in the path of movement of plastic material carried thereby, said rotatory body having a flat end face contacting with the flat face of said carrier.

12. The combination with a horizontal, rotatory carrier having pockets therein for receiving dough, and scale plates in said pockets for ejecting the dough therefrom, the surfaces of said carrier and scale plates being flat, and coinciding with each other, when the scale plates are in discharging position, of a vertical, rotatory, inflexible body having a circular surface and held contiguous with the surface of said carrier and arranged transversely across the path of travel of dough discharged from said pockets.

PAUL B. STREICH.